United States Patent
Guo et al.

(10) Patent No.: US 7,058,077 B1
(45) Date of Patent: Jun. 6, 2006

(54) FLEXIBLE FRAME STRUCTURE FOR A CDMA WIRELESS NETWORK

(75) Inventors: Ning Guo, Nepean (CA); Mo-Han Fong, Verdun (CA); Alberto Gutierrez, Plano, TX (US); Wen Tong, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/762,991

(22) PCT Filed: Aug. 11, 1999

(86) PCT No.: PCT/US99/18222

§ 371 (c)(1),
(2), (4) Date: Feb. 14, 2000

(87) PCT Pub. No.: WO00/10298

PCT Pub. Date: Feb. 24, 2000

Related U.S. Application Data

(60) Provisional application No. 60/096,886, filed on Aug. 17, 1998.

(51) Int. Cl.
H04J 3/16 (2006.01)
H04J 3/24 (2006.01)

(52) U.S. Cl. .................................. 370/465; 370/474
(58) Field of Classification Search ................ 370/338, 370/349, 389, 382, 465, 470, 474; 714/748, 714/744, 751
See application file for complete search history.

(56) References Cited

U.S. PATENT DOCUMENTS

| | | | |
|---|---|---|---|
| 4,939,731 A | 7/1990 | Reed et al. | 371/32 |
| 5,313,473 A | 5/1994 | Darmon et al. | 371/35 |
| 5,477,550 A | 12/1995 | Crisler et al. | 371/32 |
| 5,533,019 A * | 7/1996 | Jayapalan | 370/352 |
| 5,600,663 A | 2/1997 | Ayanoglu et al. | 371/41 |
| 5,629,948 A | 5/1997 | Hagiwara et al. | 371/32 |
| 5,719,883 A | 2/1998 | Ayanoglu | 371/35 |
| 5,844,918 A | 12/1998 | Kato | |
| 5,946,320 A * | 8/1999 | Decker | 714/748 |
| 5,968,197 A * | 10/1999 | Doiron | 714/748 |
| 5,983,382 A * | 11/1999 | Pauls | 714/744 |
| 6,126,310 A * | 10/2000 | Osthoff et al. | 714/751 |
| 6,208,663 B1 * | 3/2001 | Schramm et al. | 370/465 |
| 6,501,786 B1 * | 12/2002 | Okamoto | 370/506 |

FOREIGN PATENT DOCUMENTS

JP 0921447 A 8/1997

* cited by examiner

*Primary Examiner*—Andrew C. Lee
(74) *Attorney, Agent, or Firm*—Haynes and Boone, LLP

(57) ABSTRACT

A flexible frame arrangement for a CDMA wireless communications network is disclosed. A signal for transmission in the network includes several frames for transferring data between network nodes. At least one of the frames includes a hierarchical sub-frame structure having a physical layer frame and an interleaver block, a forward error control (FEC) block, and an automatic repeat request (ARQ) block. The sub-frame arrangement may be used in a spread spectrum wireless network such as CDMA2000 or W-CDMA. The FEC blocks transmit error control information and are subdivided into one or more of the ARQ blocks. Each ARQ block includes information bits and overhead bits such as cyclic redundancy code (CRC) bits and zero bits.

16 Claims, 1 Drawing Sheet

FLEXIBLE FRAME STRUCTURE FOR A CDMA WIRELESS NETWORK

CROSS REFERENCE

This application claims the benefit of Provisional Application Ser. No. 60/096,886 filed Aug. 17, 1998.

TECHNICAL FIELD

This invention relates generally to management techniques for a wireless communications network and, more particularly, to a system and method for structuring a frame format in a wireless cellular or personal communications service network.

BACKGROUND

There are many types of frequency division multiplexed network technologies, including global systems mobile (GSM), time division multiple access (TDMA), and advanced mobile phone service (AMPS) and common frequency technologies like code division multiple access (CDMA). Likewise, there are many types of packet data technology that are being implemented with these mobile network technologies. For example, global packet radio services (GPRS) and enhanced data rate for GSM evolution (EDGE) technologies are being developed to implement packet data technology for personal communications services (PCS) such as GSM and TDMA networks, respectively.

These technologies are discussed by various standards, such as the Internet Engineering Task Force (IETF), the International Telecommunications Union (ITU) for International Mobile Telecommunications 2000 (IMT-2000) and the Telecommunications Industry Association (TIA) Standards. These standards define, among other things, specific layering techniques for categorizing specific functions for the transfer of frames, or groups, of data in a physical medium (e.g., air or wire). The standards also define specific parameters for the frame structure.

Many parameters related to the framing of data in a wireless network have a strong impact on the performance of the network. For voice application, a frame error correction code (FEC) and a frame length are chosen to provide sufficient performance, and acceptable voice quality, with respect to a signal to noise ratio (SNR), delay, and a frame error rate (FER). For data applications, the requirements for acceptable performance with respect to FER, SNR, and delay will differ for those of voice applications. The FEC employed for data applications may differ from that employed in voice applications, and the relationship between FER and SNR will differ as well. Furthermore, the FER, SNR, and delay requirements will differ between circuit and packet data applications. Further still, radio environment (e.g., multipath fading) will also have an impact on the FER performance and its relationship with SNR and frame length. Therefore, for these technologies, it is desirable to parameterize the data frames in order to achieve efficient operation depending on the radio environment, application, and deployment situation.

Consider for example a wireless network using CDMA2000 technology. CDMA2000 refers to a third generation wireless technology, or 3rd generation wireless cellular/PCS technology, based on interim standard IS-95 CDMA. CDMA2000 is similar to wideband CDMA, or "W-CDMA," which refers to a 3rd generation wireless cellular/PCS technology based on spread spectrum CDMA proposed in Europe. Only CDMA2000 will be discussed for the sake of simplify and clarity, it being understood that different network technologies, including W-CDMA, will behave similarly.

Two types of coding that may be used with CDMA2000 are Turbo and Convolutional codes. For Turbo codes, the trend is for a decreasing SNR, given a fixed bit error rate (BER) or FER, as the frame length increases. For Convolutional codes, the BER remains relatively constant with frame length, for a constant SNR. Also, the FER degrades as the frame length increases. These two coding types will require different frame configurations for optimal performance.

Another factor in choosing a frame configuration is the complexity of the mobile unit. The specific choice of frame configuration will have both complexity and performance implications.

In furtherance of the CDMA2000 example, a typical frame may be 20 milliseconds (ms). As transmission rates increase, the number of bits in a 20 ms frame becomes very large. Several problems often result. For one, many wireless communication systems are tailored for voice instead of data. Decoding delays are less desirable in voice transmissions; bit errors are less desirable in data transmissions.

Considering these and other inherent problems, it is desired to have a telecommunications system that provides sufficient parameterization of the frame configurations in order to maximize the efficient operation of the cellular/PCS network.

It is also desired to have a telecommunications system that is flexible for balancing decoding delays vs. frame errors in an efficient manner.

It is further desired to maintain acceptable bit error rates and frame error rates.

It is still further desired to have a system that accommodates different transmission rates.

SUMMARY

In response to the problems and needs described above, provided is a flexible frame arrangement for a wireless communications network, such as CDMA2000 or W-CDMA. In one embodiment, a signal for transmission in the network includes several frames for transferring data between network nodes. At least one of the frames includes a hierarchical sub-frame structure having a physical layer frame, an interleaver block, a forward error control (FEC) block, and an automatic repeat request (ARQ) block.

In some embodiments, the frame structure is used in a spread spectrum wireless network. The FEC blocks include error control information, with each FEC block being subdivided into one or more ARQ blocks. Each ARQ block may include information bits and overhead bits such as cyclic redundancy code (CRC) and zero bits.

In some embodiments, the number of ARQ blocks is responsive to different radio environments for producing a relatively high throughput. Also, the number of ARQ blocks can change for voice or data information.

In some embodiments, the frame structure supports different types of code, including a Convolutional code, where the overhead bits (zero bits) of the ARQ blocks effectively block the Convolutional code.

In some embodiments, the frame structure modifies the number of FEC blocks and ARQ blocks to balance requirements for data transmission or voice transmission. The number of blocks can also be modified to promote efficient operation depending on the radio environment and mobile station complexity. Furthermore, the number of blocks can be modified to accommodate different transmission rates.

A benefit of the present invention is that it parameterizes the data frames used in these networks to promote efficient operation depending on the radio environment and mobile station complexity.

Another benefit of the present invention is that it accommodates different transmission rates.

Another benefit of the present invention is that it supports the frame coding as in the IS-95 standard.

DETAILED DESCRIPTION

Figure 1:
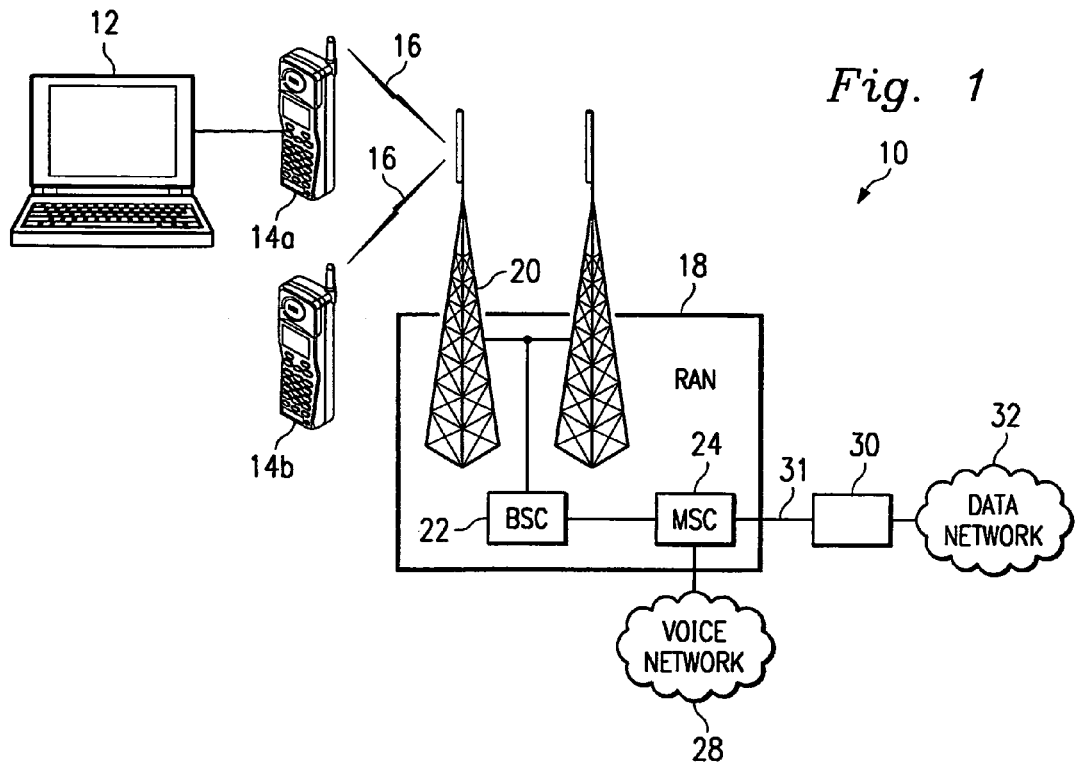
FIG. 1 is a schematic block diagram of a simplified CDMA network.

FIG. 1 depicts a communication network 10 for implementing one embodiment of the present invention. The network 10 includes a computer 12 coupled to a first mobile station 14a and a second, stand-alone mobile station 14b. The computer 12 may be a laptop computer and the mobiles stations 14a, 14b (referenced collectively as mobiles 14) may be wireless telephones. It is understood that the following disclosure provides many different embodiments, or examples, for implementing different features. Techniques and requirements that are only specific to certain embodiments should not be imported into other embodiments. Also, specific examples of networks, components, and formats are described below to simplify the present disclosure. These are, of course, merely examples and are not intended to limit the invention from that described in the claims.

The mobiles 14 communicate with a Radio Access Network (RAN) 18 via an air interface 16. In the present embodiment, the air interface 16 utilizes CDMA2000 technology to transfer messages between the mobiles 14 and the RAN 18 via certain radio frequency (air interface) channels.

In the present embodiment, the RAN 18 includes a base transceiver station 20, a base station controller 22, and a mobile switching station 22. It is understood that the RAN 18 is simplified for the sake of clarity, and may also include other necessary elements. At intermittent times, the mobiles 14 will measure a signal quality parameter of transmissions from specific base transceiver stations. The quality parameter may be a received signal strength (RSSI), or other appropriate parameters such as energy per chip per total noise (EC/IO), bit error rate (BER), frame error rate (FER), or color code.

The mobile switching station 24 of the RAN 18 is coupled to a voice network 28. The voice network 28 includes the Public Switch Telephone Network (PSTN, not shown) which utilizes necessary hardware and software, such as DMS-100, DMS-250, or DMS-500 switches manufactured by Nortel Networks Corporation, to direct calls placed and received from voice terminals, such as telephones, and/or from data terminals, such as computers.

The PSTN may also accommodate wireless calls from the mobiles 14 via the voice network 28. The description of the voice network 28, including the PSTN and the switches, has been greatly simplified because these elements are well known to those of ordinary skill in the art.

The RAN 18 is also coupled to a data network node 30 via an interface 31. The data network node 30 is further coupled to a data/IP network 32 that provides data services via components such as a gateway switch, a gatekeeper switch, DMS switches and data terminals (not shown). The gatekeeper switch functions as the intelligence of a voice over IP network and can control and optimize a service provider's network regarding bandwidth management, subscriber access, billing and security services, etc. It is understood that the RAN 18 and other components of the network 10 have been discussed by various standards, to define, among other things, specific layering techniques for categorizing specific functions for the transfer of frames, or groups, of data in a physical medium (e.g., air or wire).

When coupled to the data network node 30, the mobiles 14 may be considered a host that changes its point of attachment from one network to another. Therefore, the data network node 30 may operate as, or be connected to, a home agent or foreign agent of the data/IP network 32.

Specific nodes of the network 10, including the mobiles 14, the data network node 30, and the RAN 18, include processing systems for controlling operation of the network. Specifically, these nodes include a processor such as a central processing unit or a digital signal processing unit, a memory system including volatile and non-volatile memory, and an interface system, all for performing specific programming tasks. In many instances, the programming tasks are distributed across different components, while in other instances, the programming tasks are primarily performed in only one node. These nodes can thereby operate as transmitters, receivers, encoders, decoders, interleavers and other functional devices, as required by the data being sent and the overall network 10.

Figure 2:
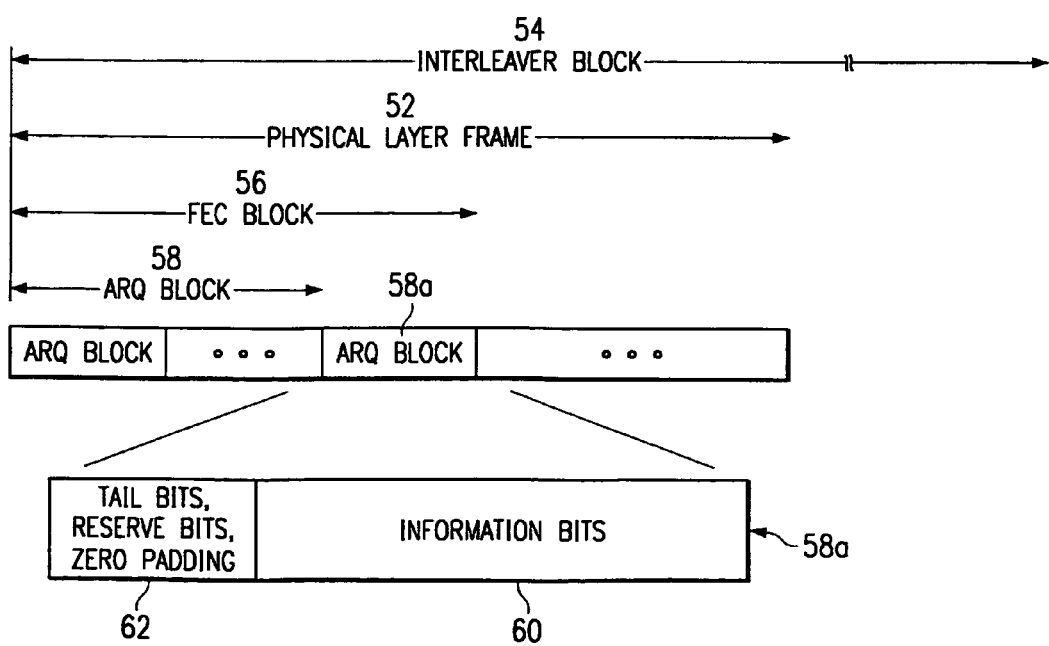
FIG. 2 is a sub-frame structure for a frame used in the CDMA network of FIG. 1.

Referring now to FIG. 2, the reference numeral 50 designates a generalized frame structure for supporting sub-frames within the communication network 10 of FIG. 1. As discussed above, the present embodiment of the network 10 is described in the context of CDMA2000 technology. However, the discussion provided herein brings certain modification and enhancements to many conventional cellular/PCS technologies. Specifically, the frame structure 50 is parameterized so that it can be configured for efficient operation depending on the RAN 18 and the mobiles 14. As discussed further below, the frame structure 50 provides several degrees of freedom, all or part of which may be selectively adopted for different embodiments.

The frame structure 50 provides a hierarchical configuration of elements that support sub-frame operation. The structure includes a physical layer frame 52, an interleaver block 54, an FEC block 56, and an automatic repeat request (ARQ) block 58. In general, the interleaver block 54 may encompass a plurality of physical layer frames 52, or the physical layer frame may encompass a plurality of interleaver blocks. In conventional systems, every physical layer frame has a group of information bits and overhead bits, including cyclic redundancy code (CRC) bits for error detection, tail bits (e.g., zero bits), etc. For the sake of simplicity and clarity, the remainder of this disclosure assumes that the physical layer frame 52 and the interleaver block 54 are the same length.

In the present embodiment, the physical layer frame 52 includes one or more FEC blocks 56 and each FEC block includes one or more ARQ blocks 58. Each ARQ block 58 is similarly constructed. For the sake of example, an ARQ block 58a is expanded to illustrate its layout. In general, the ARQ block 58a includes information bits 60 and overhead bits 62.

In the present embodiment, however, the set of information bits 60 and overhead bits 62 are the smallest parameter in the ARQ block. For the remaining discussion, certain parameters of the frame structure 50 are defined as follows:

| | |
|---|---|
| $N_{INT}$ = | the length of the interleaver block; |
| $N_F$ = | the number of FEC blocks 56 per frame; |
| $N_A$ = | the number of ARQ blocks 58 per frame; |
| $N_I$ = | the number of information bits in each ARQ block; |
| $N_{CRC}$ = | the number of CRC bits in each ARQ block; |
| $N_Z$ = | the number of zero bits in each ARQ block. |

It is noted that the number of zero bits $N_Z$ can be zero. Fur such a case, one set of zero bits may be appended to the physical layer frame to aid in decoding the FEC code.

Table 1 below provides examples of some frame configurations for 19.2 kbps and 38.4 kbps frame rates. Referring to the first row of Table 1, in this example, there is one FEC block 56 and one ARQ block 58 per physical layer frame 52. For this example, the zero bits of the ARQ block serve as zero bits for the FEC code. Referring to the second and third rows of Table 1, in these examples, there are two frame configurations which support a 38.4 kbps frame rate. The second row is similar to the first row, but at twice the data rate. The third row has two ARQ blocks 58 and one FEC block 56 per physical layer frame 52. The FEC encoding is over the same number of bits for both the second and third rows (768 bits in the present example), but the example of the third row contains more overhead since it contains additional CRC and zero bits, as compared to the example of the second row. However, the third row supports retransmission of the ARQ block 58, while the first and second rows do not.

TABLE 1

Examples of 19.2 kbps and 38.4 kbps frame configurations

| | $N_F$ | $N_A$ | $N_I$ | $N_{CRC}$ | $N_Z$ |
|---|---|---|---|---|---|
| 19.2 kbps with one ARQ block per frame | 1 | 1 | 360 | 16 | 8 |
| 38.4 kbps with one ARQ block per frame | 1 | 1 | 744 | 16 | 8 |
| 38.4 kbps with two ARQ blocks per frame | 1 | 2 | 360 | 16 | 8 |

Typically, ARQ blocks require that, once data is sent, the receiver must check the error correction to determine if the data is correct. The receiver will ask for a retransmission if the data is not correct. In some cases, depending on the length of the ARQ block, it may be desirable to use different types of error correction. Also, it may be desirable to set the number of ARQ blocks according to the type of FEC code (e.g., Turbo or Convolutional). It may also be desirable to limit the length of the ARQ block 58 for other parameter purposes.

For the case of Convolutional FEC codes, zero bits in the ARQ block 58 effectively block the Convolutional code. That is, the number of zero bits is equal to the number of memory elements of the Convolutional Code. This is true even if the length of the FEC block 56 is configured to contain multiple ARQ blocks. To better illustrate this point, consider the third row of Table 1. The encoder receives the first ARQ block 58 followed by the second ARQ block, and encodes each one in the order received. Each ARQ block consists of 360 information bits followed by 16 CRC bits and 8 zero bits. The 8 zero bits of the first ARQ block effectively block the Convolutional code because the output bits of the FEC code for the second ARQ block are independent of the first ARQ block. Thus each ARQ block can be decoded independently without a loss in performance (with the exception of overhead) with respect to decoding both ARQ blocks simultaneously.

Turbo encoders consist of two constituent Convolutional codes, each separated by an interleaver either in parallel or serial configuration. In either configuration, the Turbo interleaver will scramble the ARQ block 58 such that the entire FEC block 56 must be decoded simultaneously. In other words, when Turbo codes are employed, the FEC block 56 is decoded simultaneously, even though an FEC block contains more than one ARQ block. As a result, different performance characteristics and sub-frame configurations will arise.

Table 2, below, summarizes parameters that are compatible with CDMA2000 and support existing data rates. Extension of this table for higher rates is straightforward. In general, there are multiple ARQ Blocks per FEC Block and:

$$1 \leq N_F \leq N_A.$$

Exemplary choices for $N_A$ that support backward compatibility are listed for each data rate along with the number of information bits per ARQ Block ($N_I$).

TABLE 2

Frame parameters for rate 1/3 FEC Code

| Data Rate | $N_A$ | $N_F$ | $N_I$ | $N_{CRC}$ | $N_T$ |
|---|---|---|---|---|---|
| 19.2 kbps | $1 \leq N_A \leq 2$ | $1 \leq N_F \leq N_A$ | $N_A = 1, N_I = 360$ | 16 | 8 |
| | | | $N_A = 2, N_I = 168$ | | |
| 19.2 kbps | $1 \leq N_A \leq 2$ | $1 \leq N_F \leq N_A$ | $N_A = 2, N_I = 172$ | 16 | 0* |
| 38.4 kbps | $1 \leq N_A \leq 4$ | $1 \leq N_F \leq N_A$ | $N_A = 1, N_I = 744$ | 16 | 8 |
| | | | $N_A = 2, N_I = 360$ | | |
| | | | $N_A = 4, N_I = 168$ | | |
| 76.8 kbps | $1 \leq N_A \leq 8$ | $1 \leq N_F \leq N_A$ | $N_A = 1, N_I = 1512$ | 16 | 8 |
| | | | $N_A = 2, N_I = 744$ | | |
| | | | $N_A = 4, N_I = 360$ | | |
| | | | $N_A = 8, N_I = 168$ | | |
| 153.6 kbps | $1 \leq N_A \leq 16$ | $1 \leq N_F \leq N_A$ | $N_A = 1, N_I = 3048$ | 16 | 8 |
| | | | $N_A = 2, N_I = 1512$ | | |
| | | | $N_A = 4, N_I = 744$ | | |
| | | | $N_A = 8, N_I = 360$ | | |
| | | | $N_A = 16, N_I = 168$ | | |
| 307.2 kbps | $1 \leq N_A \leq 32$ | $1 \leq N_F \leq N_A$ | $N_A = 1, N_I = 6120$ | 16 | 8 |
| | | | $N_A = 2, N_I = 3048$ | | |
| | | | $N_A = 4, N_I = 1512$ | | |
| | | | $N_A = 8, N_I = 744$ | | |
| | | | $N_A = 16, N_I = 360$ | | |
| | | | $N_A = 32, N_I = 168$ | | |
| 614.4 kbps | $1 \leq N_A \leq 64$ | $1 \leq N_F \leq N_A$ | $N_A = 1, N_I = 12264$ | 16 | 8 |
| | | | $N_A = 2, N_I = 6120$ | | |
| | | | $N_A = 4, N_I = 3048$ | | |
| | | | $N_A = 8, N_I = 1512$ | | |
| | | | $N_A = 16, N_I = 744$ | | |
| | | | $N_A = 32, N_I = 360$ | | |
| | | | $N_A = 64, N_I = 168$ | | |

*since no zero bits are included in the ARQ block, then in this example, 8 zero bits are appended to each physical layer frame.

For the case of Turbo codes, it is desirable to support large FEC blocks since the performance of the code improves with a larger block size. A large number of bits per FEC block, however, causes complexity at the receiver for decoding very large frames. For this reason, it may be desirable to adjust interleaver block size and FEC block size in an application which employs Turbo codes.

For Convolutional code, the BER is responsive to FEC block size. For medium to large FEC block sizes (block sizes less than approximately 5 constraint lengths), the BER is relatively constant with FEC block size, for a fixed SNR. For small to medium block sizes, the BER is a function of the FEC block size. Therefore, for former cases, frame throughput $R_{THR}$ is responsive to the length of the ARQ block (designated with the variable L) and a retransmission probability $P_{RETX}$. The probability of retransmission $P_{RETX}$ increases monotonically as the ARQ block length L increases. This is because for the case of Convolutional code, the FER decreases for larger block sizes even as the SNR and BER remain constant. Consider the following equation, which applies to a 20 ms frame length:

$$R_{THR}=L(1-P_{RETX})/20.$$

This phenomenon will have a large impact on overhead due to retransmission of frames over the air interface. The smaller the ARQ block length L (in milliseconds), the less overhead due to retransmissions. On the other hand, the overhead due to CRC and zero bits increases with a smaller ARQ block length L. Thus, there is a tradeoff between ARQ Block length due to probability of retransmissions and overhead due to CRC and zero bits.

For relatively short ARQ blocks, there is a degradation of the throughput $R_{THR}$ (and of efficiency) at low BER probabilities due to additional overhead from CRC and padding bits. However, as the BER probability increases ($P_{RETX}$ increases), the throughput $R_{THR}$ is better with small ARQ block lengths L since there is more overhead in retransmission of the entire FEC block compared to retransmission of an ARQ block.

Given the above observations and frame structure, the network 10 is given the flexibility for efficient use of the network. Also, the network 10 is flexible for balancing decoding delays vs. bit errors in an optimum manner. Furthermore, the data frames are parameterized to promote efficient operation depending on the radio environment and mobile station complexity, while maintaining acceptable bit error rates and frame error rates and accommodating different transmission rates. Further still, the frame structure 50 is relatively easy to implement because it requires minimum changes for the frame coding.

Although illustrative embodiments of the invention have been shown and described, other modifications, changes, and substitutions are intended in the foregoing disclosure. Also, different considerations may require different lengths and number of frames and blocks. For example, power control considerations may fix the length of the physical layer frame 52 so that the interleaver technique needs to spread out burst errors over multiple physical layer frames. Therefore, different interleaver lengths for different physical layer frame lengths may be required. Accordingly, it is appropriate that the appended claims be construed broadly and in a manner consistent with the scope of the disclosure.

What is claimed is:

1. An apparatus comprising a node for transmitting a wireless signal, the signal having:
   a plurality of frames for transferring data from the node; and
   a frame structure coupled to at least one frame of the plurality of frames, the frame structure comprising:
   an automatic repeat request (ARQ) block having a first bit length;
   a forward error control (FEC) block for transmitting error control information, the FEC block having a second bit length;
   a physical layer frame having a third bit length; and
   an interleaver block having a fourth bit length wherein the first, second, and fourth bit lengths are each different bit lengths;
   wherein the physical layer frame includes multiple FEC blocks and each FEC block includes multiple ARQ blocks; and
   wherein no ARQ block includes any tail bits, and the physical layer frame includes multiple tail bits.

2. An apparatus comprising a node of a spread spectrum wireless network which transmits wireless signals that include a frame structure having one or more forward error control (FEC) blocks for transmitting error control information, each FEC block being subdivided into one or more automatic repeat request (ARQ) blocks, wherein each ARQ block includes a plurality of information bits and a plurality of overhead bits, wherein the frame structure supports multiple wireless environments in the spread spectrum wireless network, and wherein the number of ARQ blocks is responsive to the environment for producing a relatively high throughput.

3. The apparatus of claim 2 wherein the overhead bits include both cyclic redundancy code (CRC) bits and tail bits.

4. An apparatus comprising a node of a spread spectrum wireless network which transmits wireless signals that include a frame structure having one or more forward error control (FEC) blocks for transmitting error control information, each FEC block being subdivided into one or more automatic repeat request (ARQ) blocks, wherein each ARQ block includes a plurality of information bits and a plurality of overhead bits, wherein the frame structure supports multiple information types in the spread spectrum wireless network, and wherein the number of ARQ blocks is responsive to whether the information is voice or data.

5. An apparatus comprising a node of a spread spectrum wireless network which transmits wireless signals that include a frame structure having one or more forward error control (FEC) blocks for transmitting error control information, each FEC block being subdivided into one or more automatic repeat request (ARQ) blocks, wherein each ARQ block includes a plurality of information bits and a plurality of overhead bits, wherein the frame structure supports a Convolutional FEC code, and wherein the overhead bits of the ARQ blocks effectively block the Convolutional FEC code.

6. An apparatus comprising a node of a spread spectrum wireless network which transmits wireless signals that include a frame structure having one or more forward error control (FEC) blocks for transmitting error control information, each FEC block being subdivided into one or more automatic repeat request (ARQ) blocks, wherein each ARQ block includes a plurality of information bits and a plurality of overhead bits, wherein the number of FEC blocks and ARQ blocks are modifiable to balance requirements for data transmission and voice transmission.

7. An apparatus comprising a node of a spread spectrum wireless network which transmits wireless signals that include a frame structure having one or more forward error control (FEC) blocks for transmitting error control information, each FEC block being subdivided into one or more automatic repeat request (ARQ) blocks, wherein each ARQ block includes a plurality of information bits and a plurality of overhead bits, wherein the number of FEC blocks and ARQ blocks are modifiable to promote efficient operation depending on a wireless environment and mobile station complexity.

8. An apparatus comprising a node of a spread spectrum wireless network which transmits wireless signals that include a frame structure having one or more forward error control (FEC) blocks for transmitting error control information, each FEC block being subdivided into one or more automatic repeat request (ARQ) blocks, wherein each ARQ block includes a plurality of information bits and a plurality of overhead bits, wherein the number of FEC blocks and ARQ blocks, and the number of information bits in the ARQ blocks, are modifiable to accommodate different transmission rates.

9. A processing system for communicating in a personal communications service wireless network, the processing system comprising:
an interface for receiving information bits from a mobile station;
an interface for delivering the information bits to a second network; and
means for arranging the information bits into a frame structure comprising one or more forward error control (FEC) blocks for transmitting error control information;
wherein each FEC block is further subdivided into one or more automatic repeat request (ARQ) blocks so that each ARQ block includes information bits and overhead bits; and
wherein the overhead bits include cyclic redundancy code (CRC) bits but no tail bits, and wherein one or more tail bits are appended to the frame structure.

10. A processing system for communicating in a personal communications service wireless network, the processing system comprising:
an interface for receiving information bits from a mobile station;
an interface for delivering the information bits to a second network; and
means for arranging the information bits into a frame structure comprising one or more forward error control (FEC) blocks for transmitting error control information;
wherein each FEC block is further subdivided into one or more automatic repeat request (ARQ) blocks so that each ARQ block includes information bits and overhead bits; and
wherein the arranging means supports multiple wireless environments in the spread spectrum wireless network so that the number of ARQ blocks is responsive to the environment for producing a relatively high throughput.

11. A processing system for communicating in a personal communications service wireless network, the processing system comprising:
an interface for receiving information bits from a mobile station;
an interface for delivering the information bits to a second network; and
means for arranging the information bits into a frame structure comprising one or more forward error control (FEC) blocks for transmitting error control information;
wherein each FEC block is further subdivided into one or more automatic repeat request (ARQ) blocks so that each ARQ block includes information bits and overhead bits; and
wherein the arranging means supports multiple communication types in the spread spectrum wireless network, and wherein the number of ARQ blocks is responsive to whether the communication type is voice or data.

12. A processing system for communicating in a personal communications service wireless network, the processing system comprising:
an interface for receiving information bits from a mobile station;
an interface for delivering the information bits to a second network; and
means for arranging the information bits into a frame structure comprising one or more forward error control (FEC) blocks for transmitting error control information;
wherein each FEC block is further subdivided into one or more automatic repeat request (ARQ) blocks so that each ARQ block includes information bits and overhead bits; and
wherein the arranging means supports a Convolutional FEC code, and wherein the overhead bits of the ARQ blocks effectively blocks the Convolutional FEC code.

13. A processing system for communicating in a personal communications service wireless network, the processing system comprising:
an interface for receiving information bits from a mobile station;
an interface for delivering the information bits to a second network; and
means for arranging the information bits into a frame structure comprising one or more forward error control (FEC) blocks for transmitting error control information;
wherein each FEC block is further subdivided into one or more automatic repeat request (ARQ) blocks so that each ARQ block includes information bits and overhead bits; and
wherein the arranging means modifies the number of FEC blocks and ARQ blocks to balance requirements for data transmission and voice transmission.

14. The processing system of claim 13 wherein the overhead bits include both cyclic redundancy code (CRC) bits and tail bits.

15. A processing system for communicating in a personal communications service wireless network, the processing system comprising:
an interface for receiving information bits from a mobile station;
an interface for delivering the information bits to a second network; and
means for arranging the information bits into a frame structure comprising one or more forward error control (FEC) blocks for transmitting error control information;
wherein each FEC block is further subdivided into one or more automatic repeat request (ARQ) blocks so that each ARQ block includes information bits and overhead bits; and
wherein the arranging means modifies the number of FEC blocks and ARQ blocks to promote efficient operation depending on a wireless environment and mobile station complexity.

16. A processing system for communicating in a personal communications service wireless network, the processing system comprising:
- an interface for receiving information bits from a mobile station;
- an interface for delivering the information bits to a second network; and
- means for arranging the information bits into a frame structure comprising one or more forward error control (FEC) blocks for transmitting error control information;
- wherein each FEC block is further subdivided into one or more automatic repeat request (ARQ) blocks so that each ARQ block includes information bits and overhead bits; and
- wherein the arranging means modifies the number of FEC blocks, the number of ARQ blocks, and the number of information bits in the ARQ blocks, to accommodate different transmission rates.

* * * * *

UNITED STATES PATENT AND TRADEMARK OFFICE
CERTIFICATE OF CORRECTION

PATENT NO. : 7,058,077 B1 Page 1 of 1
APPLICATION NO. : 09/762991
DATED : June 6, 2006
INVENTOR(S) : Guo et al.

It is certified that error appears in the above-identified patent and that said Letters Patent is hereby corrected as shown below:

On the Title Page:
Block (86), the 371 (c)(1),(2),(4) date should read as -- February 14, 2001 --.

Signed and Sealed this

Thirtieth Day of January, 2007

JON W. DUDAS
*Director of the United States Patent and Trademark Office*